United States Patent [19]
Abe et al.

[11] Patent Number: 5,554,057
[45] Date of Patent: Sep. 10, 1996

[54] EXHAUST TREATMENT FOR OUTBOARD MOTOR

[75] Inventors: Kohji Abe; Akihiro Onoue; Atsushi Isogawa, all of Shizuoka-ken, Japan

[73] Assignee: Yamaha Hatsudoki Kabushiki Kaisha, Iwata, Japan

[21] Appl. No.: 168,066

[22] Filed: Dec. 14, 1993

[30] Foreign Application Priority Data

Dec. 14, 1992 [JP] Japan ................................. 4-353655

[51] Int. Cl.$^6$ ............................................ B63H 21/32
[52] U.S. Cl. .......................... 440/89; 440/900; 60/310; 60/277
[58] Field of Search .................... 60/289, 290, 310, 60/299, 277; 440/900, 89

[56] References Cited

U.S. PATENT DOCUMENTS

| | | | |
|---|---|---|---|
| 2,570,509 | 10/1951 | Bandli | 440/89 |
| 3,644,098 | 2/1972 | De Palma et al. | 23/288 |
| 4,023,361 | 5/1977 | Kojima | 60/302 |
| 4,110,979 | 9/1978 | Miyagi et al. | 60/289 |
| 4,498,876 | 2/1985 | Zemlicka | 440/89 |
| 4,732,111 | 8/1983 | Virk et al. | 60/274 |
| 4,735,046 | 4/1988 | Iwai | 60/295 |
| 4,848,082 | 7/1989 | Takahashi et al. | 60/277 |
| 5,299,961 | 4/1994 | Okamoto | 440/89 |

FOREIGN PATENT DOCUMENTS

| | | |
|---|---|---|
| 3018277 | 5/1980 | Germany . |
| 52-8932 | 3/1977 | Japan . |
| 55-12233 | 1/1980 | Japan . |
| 55-10043 | 1/1980 | Japan . |
| 57-203814 | 12/1982 | Japan . |
| 0238192 | 10/1987 | Japan ................. 440/89 |

*Primary Examiner*—Edwin L. Swinehart
*Attorney, Agent, or Firm*—Knobbe, Martens, Olson & Bear

[57] ABSTRACT

An exhaust system for a marine propulsion outboard drive wherein the exhaust gases are normally discharged to the atmosphere at a point below the level of the body of water in which the watercraft is operating. A catalyst bed is provided in the exhaust system and the catalyst bed is protected from damage by precluding the flow of water in the exhaust conduit to the catalyst bed in response to certain conditions. These conditions may be either rapid deceleration of the engine or watercraft, stopping of the engine, or any of a combination of sensed factors. The water is precluded either by purging it through air pressure or from generating heat in the exhaust conduit, by providing a heat source in the exhaust conduit that will cause water to vaporize and increase the pressure or by a valve in the exhaust conduit positioned below the catalytic bed. The preclusion of water is initiated for only a predetermined time or until the sensed condition no longer is existent.

55 Claims, 7 Drawing Sheets

EXHAUST TREATMENT FOR OUTBOARD MOTOR

BACKGROUND OF THE INVENTION

This invention relates to an exhaust treatment for an outboard motor, and more particularly to an improved catalytic exhaust system for such outboard motors.

The desirability of effectively controlling the amount of harmful exhaust gas constituents in internal combustion engines are well known. These goals are particularly desirable in conjunction with outboard motors wherein the exhaust gases are discharged not directly to the atmosphere but through the body of water in which the associated watercraft is operating. As a result of this, not only is there a danger of air pollution from undesirable exhaust gas constituents but also a problem in conjunction with possible water pollution.

Although many steps are taken in the basic design of the engine to ensure good fuel efficiency and effective exhaust gas treatment, under some instances it is desirable to also employ catalysts in the exhaust system for treatment to reduce certain harmful exhaust gas constituents. As is well known, these catalysts operate at relatively high temperatures in order to be fully effective, and their efficiency depends upon their temperature.

As has been previously noted, it is the normal practice in marine propulsion units to discharge the exhaust gases to the atmosphere through the body of water in which the watercraft is operating. This is particularly desirable because most marine propulsion systems do not offer sufficient space for full engine exhaust silencing. By discharging the exhaust gases to the atmosphere through the body of water in which the watercraft is operating, further silencing can be obtained.

However, the use of such underwater exhaust gas discharges can present some problems, particularly where catalytic exhaust systems are employed. The water level within the exhaust system can change quite abruptly during engine operation. For example, when the watercraft is traveling at a high speed and is in a planing condition, the underwater discharge and exhaust system is relatively shallowly submerged. The exhaust gas pressure is high enough so as to ensure that water cannot enter backward through the exhaust system and come into contact with the catalyst.

If, however, the boat is abruptly decelerated, then the boat and its propulsion system becomes more deeply submerged in the body of water in which the watercraft is operating. In addition, at this time the exhaust pressure falls off, and water can easily flow back into the exhaust system through the underwater exhaust gas discharge. If this water comes into contact with the catalyst, the catalyst may become polluted and inoperative or, alternatively, have its efficiency deteriorated. In a worst case situation, the catalyst bed may actually become shattered or damaged due to the impacting of water on it at its elevated temperature and the fact that many catalyst beds are of ceramic-type material. These problems are particularly acute in operating in salt-water environments as the salt in the water may offer further fouling of the catalyst.

It is therefore a principal object of this invention to provide an improved exhaust treatment for an outboard motor.

It is a further object of this invention to provide an improved arrangement for protecting an outboard motor and its catalytic exhaust system from damages or inefficiency under all running conditions.

It is a further object of this invention to provide a catalytic exhaust system for a marine propulsion unit wherein it would be ensured that the water through which the exhaust gases are discharged cannot reach the catalytic bed.

Even in marine exhaust systems that do not include catalytic treatment in the exhaust gases, there is a desirability to ensure against water encroaching into the exhaust conduit above a predetermined point. As is well known, there are times when the exhaust pulses may produce actually a negative pressure at the discharge end of the exhaust pipe that conveys the exhaust gases to its underwater exhaust gas discharge. If water can reach this level under such conditions as extreme deceleration, then there is a risk that the water can actually enter into the engine through its exhaust port. This is obviously undesirable.

It is therefore a still further object of this invention to provide an improved exhaust system for a marine propulsion unit wherein it is ensured that water cannot enter the engine through its exhaust ports.

It is a further object of this invention to provide an improved system for protecting against undue rise in the water level in the exhaust system of an outboard drive.

SUMMARY OF THE INVENTION

This invention is adapted to be embodied in a marine outboard drive that is comprised of an internal combustion engine having at least one exhaust port. A drive shaft housing and lower unit is adapted to be supported on the transom of an associated watercraft and has a propulsion device that is driven by the engine for propelling the watercraft through a body of water. An underwater exhaust gas discharge is formed in the drive shaft housing and lower unit for discharging exhaust gases to the atmosphere through the body of water in which the watercraft is operating. Exhaust conduit means deliver exhaust gases from the exhaust port to the underwater exhaust gas discharge. Means are responsive to a sensed condition for precluding water flowing above a predetermined position in the exhaust conduit means.

DETAILED DESCRIPTION OF THE PREFERRED EMBODIMENTS OF THE INVENTION

Figure 1:
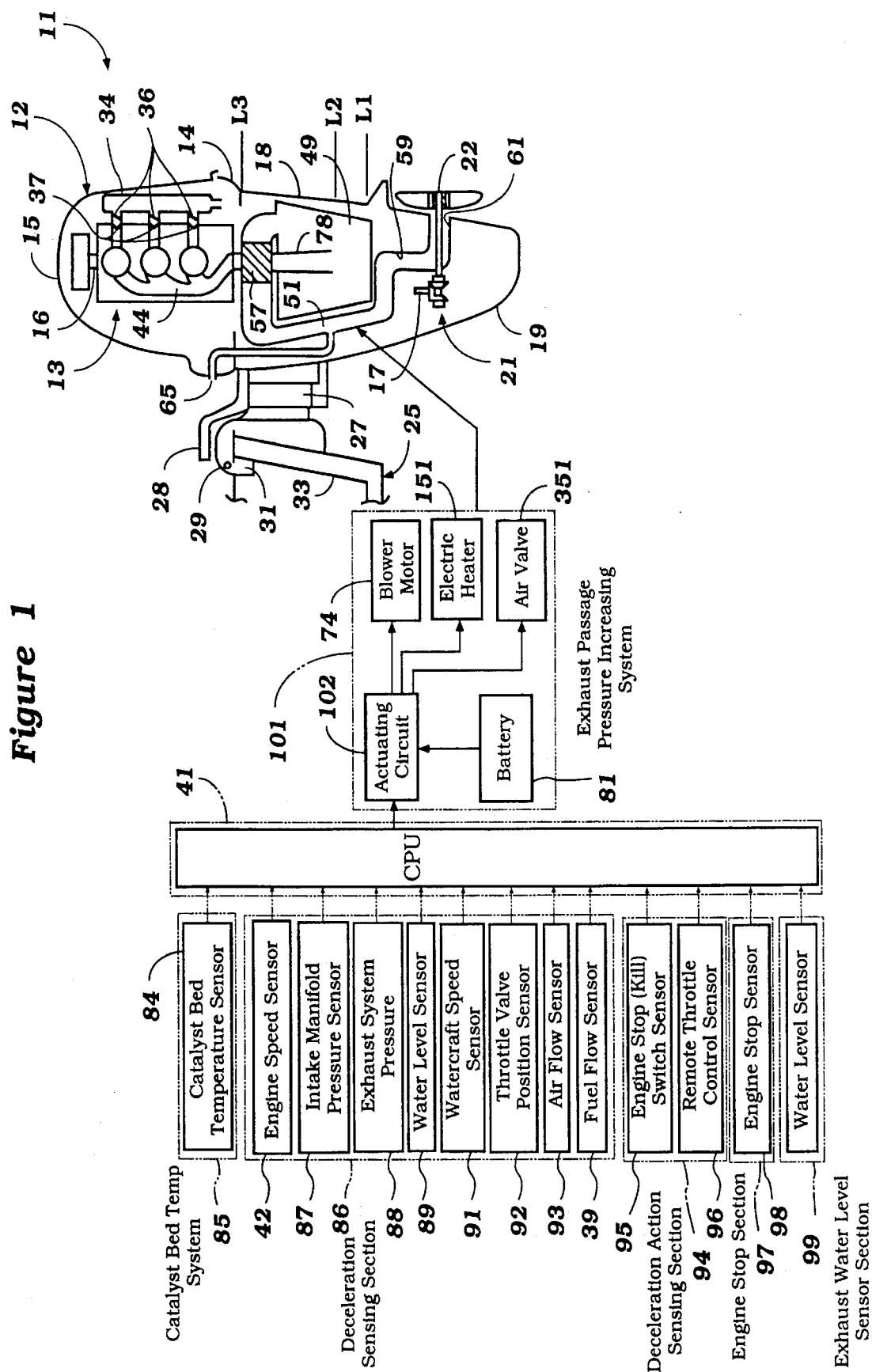
FIG. 1 is a partially schematic cross-sectional view of an outboard motor attached to the transom of an associated watercraft (shown only partially) and the various components of the system for protecting the catalytic exhaust system.
Figure 2:
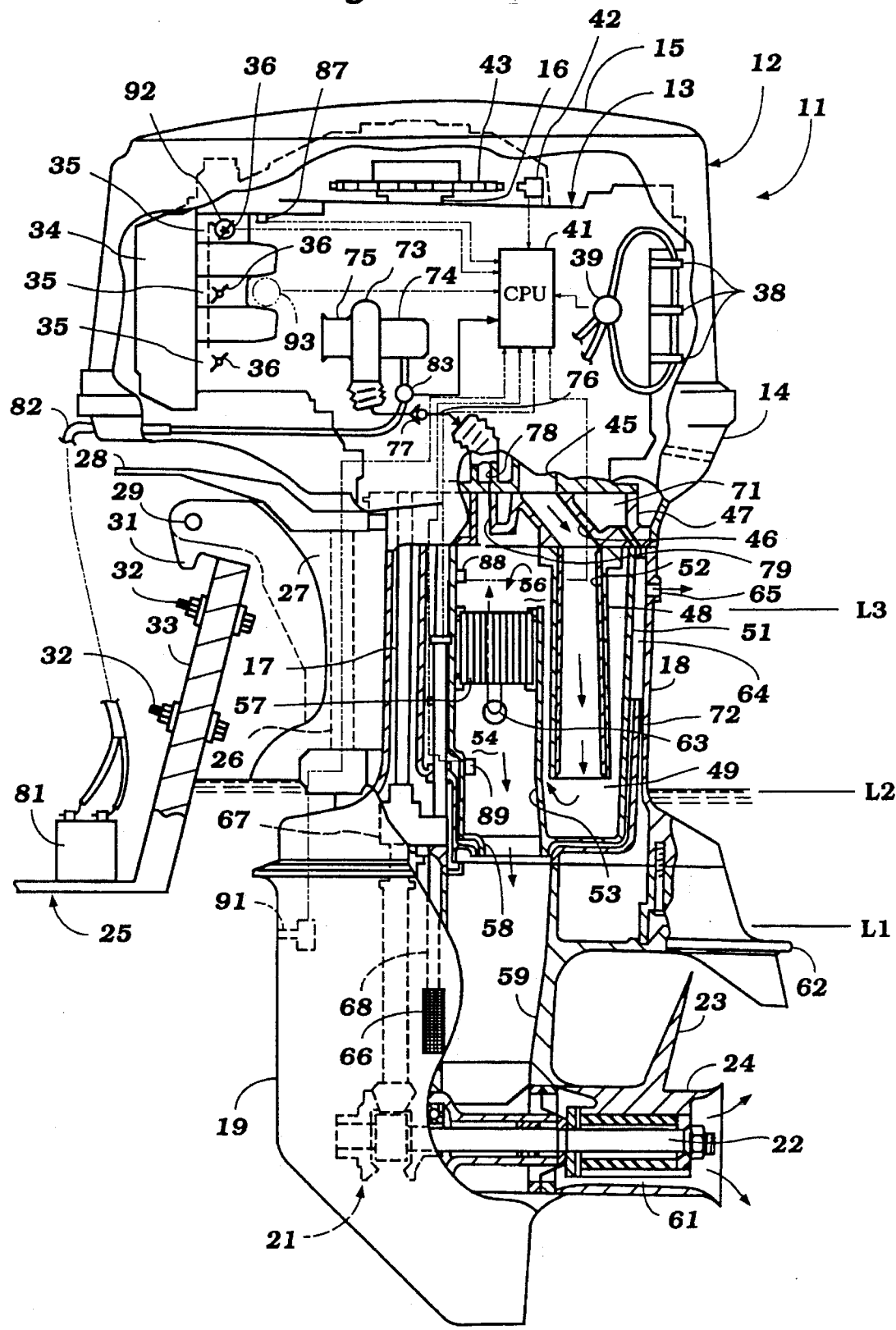
FIG. 2 is an enlarged cross-sectional view of the outboard motor portion shown in FIG. 1 and showing in more detail the actual construction.
Figure 3:
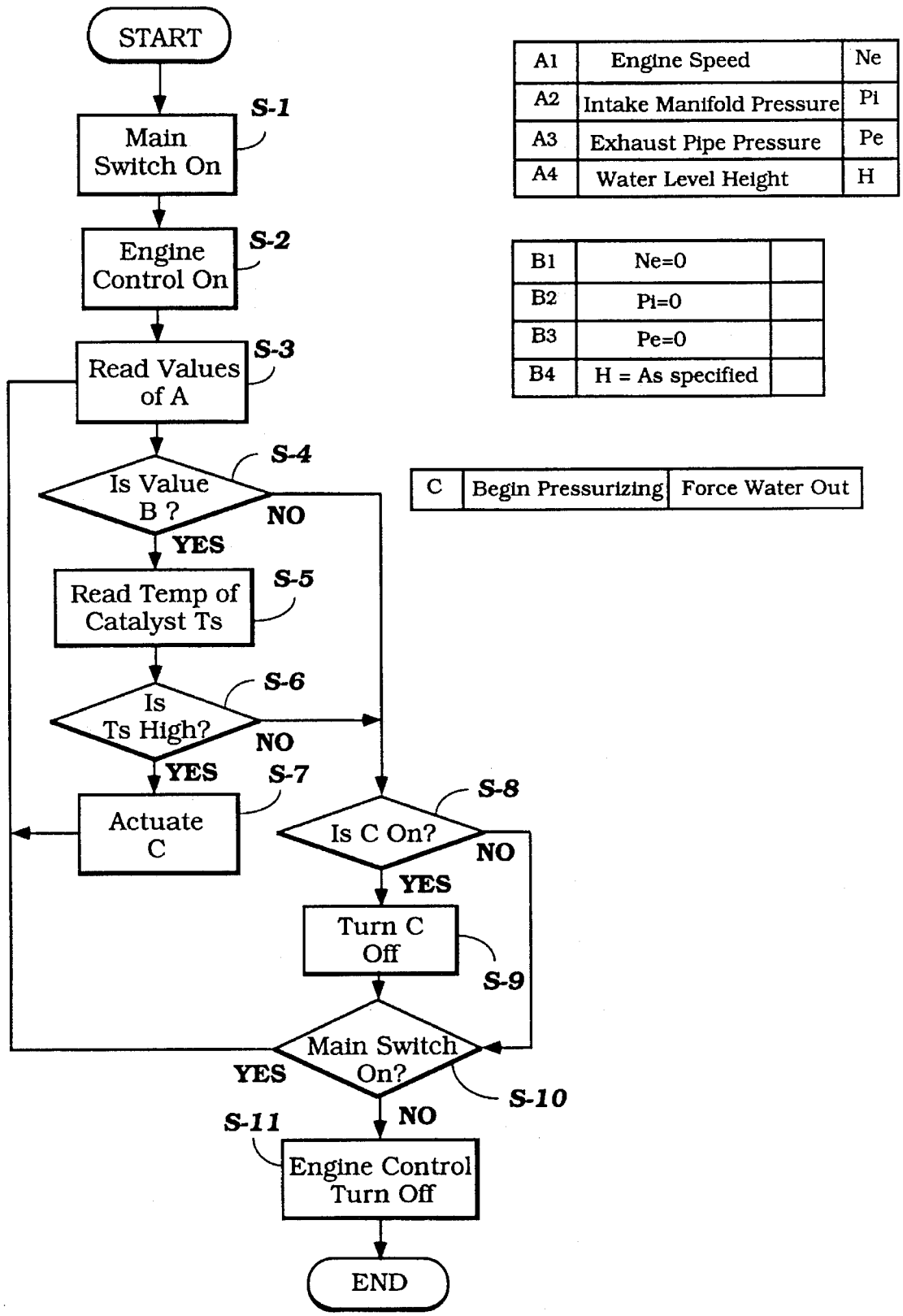
FIG. 3 is a block diagram showing a control routine in accordance with the invention.

Referring now in detail to the embodiment of FIGS. 1–3, and initially to FIGS. 1 and 2, an outboard motor constructed in accordance with an embodiment of the invention is identified generally by the reference numeral 11. The invention is described in conjunction with an outboard motor because it has particular utility in conjunction with watercraft and the exhaust systems therefor and has particular application with outboard motors. It should be readily apparent, however, that the invention may also be used in conjunction with inboard/outboard drives of the type wherein there is an exhaust system that discharges the exhaust gases from the powering internal combustion engine beneath the body of water in which the watercraft is operating.

The outboard motor 11 includes a power head assembly, indicated generally by the reference numeral 12, which is comprised of a powering internal combustion engine 13 and a surrounding protective cowling comprised of a lower tray portion 14 and an upper removable main cowling portion 15. Although the invention is capable for use with a wide variety of types of internal combustion engines, in the illustrated embodiment, the engine 13 is of the three-cylinder in-line type operating on a two-stroke crankcase compression principle. It will be readily apparent to those skilled in the art, however, that the invention may be practiced with a wide variety of types of engines. The invention does have particular utility, however, in conjunction with two cycle crankcase compression engines because these engines normally are lubricated by lubricant that is not recirculated but is passed through the engine and then burned in the combustion chambers and exhausted through the exhaust system. This presents certain problems in conjunction with exhaust emission control.

Some details of the construction of the engine 13 will be described later because they are involved in the control strategy.

The engine 13, as is typical with outboard motor practice, is supported so that its output shaft, a crankshaft 16, rotates about a generally vertically extending axis. This crankshaft is coupled to a drive shaft 17, which depends into a drive shaft housing 18 and is rotatably journalled therein in any well-known manner. A lower unit 19 depends from the drive shaft housing 18 and contains a conventional forward, neutral, reverse transmission, indicated generally by the reference numeral 21 for driving a propeller shaft 22 in selected forward and reverse directions. A propeller 23 has a hub portion 24 that is coupled to the propeller shaft 22 for propelling the associated watercraft, shown partially and indicated generally by the reference numeral 25 in a well-known manner.

A steering shaft 26 is affixed to the drive shaft housing 18 in a known manner and is supported for steering movement about a generally vertically extending steering axis in a swivel bracket 27. A tiller 28 is affixed to the upper end of the steering shaft 26 and is coupled to any form of remote steering mechanism or may be steered directly for controlling the direction of travel of the associated watercraft 25.

The swivel bracket 27 is, in turn, pivotally connected by means of a pivot pin 29 to a clamping bracket 31. This pivotal connection permits tilt and trim movement of the outboard motor 11, as is well known in this art. The clamping bracket 31 is provided with means, such as threaded fasteners 32, for a detachable connection to a transom 33 of the associated watercraft 25.

Referring now again to the power head 12, although the invention deals primarily with the exhaust system, and the internal details of the engine 13 are not particularly essential to the understanding of the invention, certain components will be described because they incorporate features that present certain control parameters to be measured.

It has been noted that the engine 13 is of the three-cylinder in-line type that operates on a two-stroke crankcase compression principle. In the illustrated embodiments, the engine 13 is mounted in the power head 12 so that its crankcase faces forwardly and the cylinder head faces rearwardly. As is conventional with two-cycle engines, an intake air charge is drawn into the crankcase chambers of the engine 13 through an induction system. This induction system includes an air intake device 34, which is contained with the protective cowling of the power head 12, and specifically within its upper housing portion 15. An air inlet (not shown) is provided in this protective cowling so that atmospheric air may be drawn into the air inlet device 34 for operation of the engine 13. The air inlet device 34 is designed so as to incorporate a silencing system for silencing the intake air charge, as is well known in this art.

The air drawn through the air inlet device 34 is transferred to a plurality of throttle bodies 35 in which throttle valves 36 are positioned so as to control the speed of the engine 13. The throttle valves 36 are all linked together by a mechanism so as to be simultaneously operable and operated through any remotely positioned throttle control in a well-known manner. The air charge is then delivered to the crankcase chambers of the engine through a suitable induction system, which includes read-type check valves 37 shown schematically in FIG. 1, which permit the air flow to occur into the crankcase chambers but prevent reverse flow when the charge is being compressed.

Although any form of charge-forming system may be employed in conjunction with the engine 13, in the illustrated embodiment the engine is provided with a fuel injection system that includes fuel injectors 38, which receive fuel from a remotely positioned fuel tank, through a supply conduit in which a flow rate sensor 39 is provided. The flow rate sensor 39 outputs its signal to a CPU, indicated generally by the reference numeral 41, which controls, among other things, the amount of fuel supplied to the engine by the injectors 38.

The engine 13 is also provided with a spark ignition system, including spark plugs (not shown) that are fired by the CPU 41 at the appropriate timing. This ignition system includes a speed sensor 42 of the pulser type which cooperates with a toothed wheel 43 affixed for rotation with the crankshaft 16 so as to provide pulses indicative of the rotational speed of the engine output shaft 16.

Of course, the fuel injection control and spark ignition control may include other sensors, some of which will be described. Some of these sensors also are employed in conjunction with the protective system for the exhaust system, which exhaust system will now be described by continued reference to FIGS. 1 and 2.

As shown schematically in FIG. 1, the engine 13 has exhaust ports that communicate with an exhaust manifold 44 that is formed integrally within the cylinder block of the engine and which has a downwardly facing discharge port 45. This discharge port communicates with a corresponding exhaust passage 46 formed in a spacer plate 47 upon which the engine 13 is mounted. The spacer plate 47 is supported on the upper side of the drive shaft housing 18 in a well-known manner. An exhaust pipe 48 is affixed to the underside of the spacer plate 47 and collects the exhaust gasses and discharges them into a first expansion chamber volume 49 formed within the drive shaft housing 18 by an inner shell 51. If desired, the internal surface of the exhaust pipe 48 may be coated with a catalytic material 52 so as to provide some treatment of the exhaust gasses before they are discharged into the first expansion chamber 49.

A vertically extending wall 53 formed within the inner shell 51 separates the first expansion chamber 49 from a second expansion chamber 54. Exhaust gasses that have flown through the first expansion chamber 49 must pass to the second expansion chamber 54 through an area 56 formed above the wall 53 so as to form a trap-like construction which will assist in ensuring that water cannot flow back through the exhaust system to the exhaust ports of the engine under extreme situations and when the exhaust protection system, to be described, may malfunction.

At the upper end of the second expansion chamber 54, there is provided a catalyst bed 57 through which the exhaust gasses must pass before they can exit the second expansion chamber 54 through a downwardly facing discharge opening 58. Hence, the exhaust gasses that flow through the exhaust system as thus far described will be silenced by successive, contractions through the exhaust pipe 48 and expansion in the expansion chamber 49, subsequent restriction or contraction in the trap section 56 and further expansion in the expansion chamber section 54. In addition, the catalyst beds 52 and 57 will treat such exhaust gas constituents as may be desired, depending upon the design. The specific catalytic materials chosen may be of any known type employed in this art.

An exhaust discharge passage 59 is formed in the lower unit 19 and receives exhaust gasses from the expansion chamber outlet 58. These exhaust gasses are then discharged to the atmosphere through the body of water in which the watercraft is operating through an underwater exhaust gas discharge. In the illustrated embodiment, this underwater exhaust gas discharge is indicated generally by the reference numeral 61, and this is of the through-the-hub type, which is discharged through the hub 24 of the propeller 23.

In FIGS. 1 and 2, there are depicted three water levels—L1, L2 and L3. The water level L1 is the water level that exists when the watercraft 25 is being propelled at a relatively high speed and is in a planing condition. This water level is just slightly above anti cavitation plate 21 of the lower unit 19. Under this running condition, substantially all of the exhaust gasses will be discharged to the atmosphere through the path as thus far described, including through the through-the-hub underwater exhaust gas discharge 61.

When the watercraft 25 is operating at a lower than planing speed or is stationary, the water level L2 will be higher. It should be noted that the lower end of the exhaust pipe 48 is disposed slightly above this lower water level. Under this condition, the exhaust gas pressure will be relatively low and not sufficient to exit through the underwater exhaust gas discharge 61. There is thus provided an above-the-water low speed exhaust gas discharge which is formed by a pair of openings 63 formed in the expansion chamber forming member 51 and which permit the exhaust gasses to flow out of the expansion chamber section 54 into a cavity 64 formed between the outer periphery of the inner shell 51 and the inner periphery of the drive shaft housing 18. An above-the-water exhaust gas discharge 65 is formed at the rear of the drive shaft housing 18 so that the exhaust gasses may be discharged through this opening when the water level is at the level L2. It should be noted that the exhaust gasses that are discharged through the opening 65 will have passed through the entire silencing section of the exhaust system, including the expansion chambers 49 and 54, and past both of the catalytic beds 52 and 57 so that even though the exhaust gasses are discharged directly to the atmosphere, they will be silenced and treated. The opening 65 is relatively restricted, however, so that when travelling at high speeds, there will be substantially no exhaust gasses transmitted directly to the atmosphere. It should be noted that this above-the-water exhaust gas discharge 65 is shown out of position in FIG. 1 for the sake of illustration purposes only.

The engine 13 is water cooled and has a cooling jacket and internal flow path which may be of any desired type. Water for cooling the engine is drawn through a water inlet opening 66 formed in the lower unit 19 by a water pump 67 driven from the drive shaft 17 at the interface between the drive shaft housing 18 and the lower unit 19. A conduit 68 extends from the water inlet opening 66 to the water pump 67. This water is then delivered to the engine cooling jacket through a supply conduit 69 which extends upwardly through the drive shaft housing 18 and communicates with the engine cooling jacket in any suitable manner. This coolant is then discharged downwardly through a cooling jacket 71 formed in the spacer plate 47 around its exhaust passage 46. The coolant is then further delivered to a water jacket formed around the expansion chamber forming inner shell 51 by an inner wall member 72 so as to cool the exhaust system. This water then spills over a weir and is discharged back into the body of water in which the watercraft is operating through any known type of discharge.

As has been noted, the highest water level experienced during normal running operations is the idle or stationary water level L2. The catalyst bed 57 is positioned above this water level and hence is protected under normal circumstances. However, there is a running condition when the water level could reach a higher level, and this is when the outboard motor 11 and associated watercraft 25 are travelling at a high speed and then suddenly decelerated. Under this condition, the water level may actually reach the level L3, and since the exhaust is generally open beneath the water, then water could reach the catalyst bed 57 and cause damage. This damage could be as severe as shattering of the bed due to its high temperature and ceramic nature, or merely fowling it with the water. If the watercraft 25 is operating in a marine environment, then the salt walter could leave deposits on the bed 57 that would cause it to lose efficiency. In accordance with an important feature of the invention, arrangements are provided in the various embodiments which ensure that the water level cannot reach a level where the bed 57 could be damaged. Alternatively, the protective system may permit the water level to reach higher points, but only after the temperature of the bed 57 is low enough that damage would not occur.

In this particular embodiment, the protection is achieved by pressurizing the exhaust conduit and exerting sufficient pressure so as to prohibit the water level from rising, or if the water level has risen, to drive the water level back downwardly. This system includes a centrifugal air pump 73 that is mounted on the side of the engine 13 within the power head 12 and which is driven by an electric motor 74. The air pump 73 draws air from within the protective cowling through an inlet 75 and discharges it to a conduit 76 in which a check valve 77 is positioned. This conduit 76 then communicates with a discharge port 78 formed in the lower portion of the cylinder block and which communicates with a further passage 79 formed in the spacer plate 47 that communicates with the expansion chamber section 54 adjacent the trap section 56 and above the catalyst bed 57.

The electric motor 74 is provided with electrical power from a storage battery 81 which may be conveniently positioned in the hull of the watercraft 25 through a pair of conductors 82. An electrically operated control switch 83, actuated by the CPU 41, controls when the electric motor 74 and pump 73 are driven. This control strategy will now be described after the various sensors employed in conjunction with the control are described.

The engine speed sensor 42 and fuel flow sensor 39 have already been described. Like those sensors, the sensors employed in conjunction with the exhaust protection system may also be employed to provide other signals for control of the running of the engine 13 by the CPU 41. In addition to those sensors which will be described, it will be obvious to those skilled in the art that still other forms of sensors may be employed for achieving the desired purpose.

The relationship of these sensors in their actual physical location appears in FIG. 2, while FIG. 1 shows the sensors schematically and their relationship with the CPU 41. Referring to these two figures, the sensor system includes a catalyst bed temperature sensor 84 which comprises a catalyst temperature sensor system section indicated by the phantom box 85 in FIG. 1. As may be seen in FIG. 2, this temperature sensor 84 is mounted in the inner shell 51 in proximity to the catalyst bed 57 and outputs its signal to the CPU 41.

Since the high water level condition exists primarily due to rapid decelerations, certain sensors also form a part of a decelerator sensing section, indicated generally by the reference numeral 86, and which includes, in addition to the engine speed sensor 42 and the fuel flow sensor 39, an intake manifold pressure sensor 87 which, as shown in FIG. 2, is mounted in the intake manifold of the engine downstream of one of the throttle bodies 35. As is well known, during rapid decelerations, the intake manifold pressure will be significantly reduced.

There is also provided an exhaust system pressure sensor 88 which is positioned at an appropriate location in the exhaust system and particularly in the area in the expansion chamber section 54 upstream of the catalyst bed 57 in the area where the high pressure air is delivered from the conduit 79. A decrease in the pressure in the exhaust system during times when the engine is running will be indicative that the engine is running at a slow speed or has stopped.

There is further provided a water level sensor 89 which is positioned in the expansion chamber 54 but below the catalyst bed 57. When the water level reaches the sensor 89, it will give a signal that will indicate that the water level is rising above the level L2 and to a point where the catalyst bed 57 might well be damaged or fouled.

There is also provided a watercraft speed sensor 91 which basically is a pitot tube type sensor that is positioned at the leading edge of the lower unit 91 and which will sense dynamic pressure and, accordingly, watercraft speed. If the watercraft speed has been high and then falls rapidly, the watercraft speed sensor 91 can indicate a rapid deceleration condition.

Associated with one of the throttle valves 36 is a throttle valve position sensor 92, and this provides an output signal indicative of throttle valve position. If the throttle valve 36 is held in a fully or largely opened position and then is closed rapidly, this will be an indication of rapid deceleration and a condition when the watercraft is being decelerated rapidly and the high water condition might exist.

The final deceleration sensor comprises an induction airflow sensor 93 which may be of the pressure-sensitive type positioned in the crankcase chambers of the engine. As is well known, sensing the crankcase pressure at certain crank angles is a good way of indicating air flow to the engine. If this air flow rate decreases suddenly, this is another good indication of rapid deceleration.

In addition to these sensors which sense actual engine or boat conditions, there is further provided a deceleration action sensing section, indicated generally by the reference numeral 94, which include sensors that sense when the operator is taking an action which is likely to produce sudden decelerations. This may include an engine kill or stop switch sensor 95 which is positioned remotely in the watercraft hull 25 and which is initiated by the operator so as to shut off the engine 13 by killing its ignition circuit. If this action is taken when the watercraft 25 is operating at a high speed, then it can also be assumed that there will be a sudden deceleration condition.

A further control is a sensor 96 which senses the position of the remote operator throttle control. If the operator moves the remote throttle control from a high speed condition to a low speed condition in a short time period, then it can be assumed that there is a deceleration condition present or imminent and protective action can be initiated promptly.

There is provided a further control section 97 which determines when the engine is actually stopped and this includes an engine stop sensor 98 indicates when the engine has been stopped. This may be done by measuring lack of rotation of the crankshaft 16, disabling of the ignition circuit, etc.

There is provided a further sensor section which is the exhaust passage internal water level sensor system indicated by the reference numeral 99 and this may include a float type device for providing a signal indicative of the actual water level in the exhaust system or in the drive shaft housing 18, which will in essence be the same.

All of these signals from the sensors described are transmitted to the CPU 41 so as to provide an indication of when protective action is required and how that protective action is initiated. This will be described later by reference to a control routine shown in FIG. 3. However, these are transmitted to an engine exhaust pressure increasing system, indicated generally by the reference numeral 101 in FIG. 5 and which includes an actuating circuit 102 for operating any of a plurality of pressure increasing systems, one of which is shown in detail in FIG. 2 and the others of which will be described later. This actuating circuit 102 is powered by the battery 81 and controls either a blower motor 74 as in the embodiment of FIGS. 1–3, an electric heater to be described later by reference to certain other embodiments, or an air valve, which will also be described later. Alternatively, several or all of these pressure increasing systems can be employed.

A control routine for protecting the catalyst is depicted in FIG. 3 and will now be described in detail by reference to that figure. This control routine may be employed with any system for precluding water from reaching the catalyst bed 57 and in the specific embodiment illustrated, this is accomplished by turning on the blower motor 74 and blower 73 so as to pressurize the expansion chamber section 54 and force any water which may be rising in this expansion chamber back downwardly into the body of water in which the watercraft is operating through the underwater exhaust gas discharge system already described. As will become apparent by description of the remaining embodiments, other methods may be employed for protecting the catalyst bed 57 from the water. In addition, FIG. 3 illustrates the measuring of only certain parameters and as has been previously discussed and as will be repeated, various other parameters can be sensed so as to determine when it is desirable to initiate protective action.

The program starts and moves to the first step S1 wherein the main switch for the control of the outboard motor 11 initiated by the operator. The engine control routine then is automatically switched on at the step S2 and certain values are read at the step S3. These values are indicated as A.

In this embodiment, four values of A are read. These are engine speed A1 (Ne), intake manifold pressure A2 (Pi), exhaust pipe pressure A3 (Pe) and water level height A4 (H). From the values of engine speed, intake manifold pressure and exhaust pipe pressure, it may be determined that not only whether the engine is running, but also if it has been decelerated rapidly. In the case that the engine 13 has been stopped or decelerated rapidly, there is a condition when the water level may rise from the level L1 to the level L2 or even to the higher level L3 and protective action may be desired. Stopping of the engine can be determined if either engine speed has gone to zero or if intake manifold pressure or exhaust pipe pressure becomes atmospheric pressure. Rapid deceleration can be determined if engine speed decreases by more than a predetermined amount in a predetermined time period or if intake manifold pressure or exhaust pipe pressure change by more than a predetermined amount in a predetermined time period. As has been previously noted, a rapid increase in intake manifold vacuum or decrease in intake manifold pressure will indicate an extreme deceleration condition and a rapid decrease in exhaust pipe pressure will also indicate a rapid deceleration.

After the values of A have been read, the program then moves to the step S4 to compare the values with the predetermined values at B which are indicative of the deceleration or stop condition. In the embodiment illustrated in FIG. 3, the determination is made as to whether the engine has stopped and thus, B1, B2 or B3 values of Ne, Pi or Pe equals zero, it will be determined that the engine has stopped. Insofar as determining the other condition of protection of the water level height H, if the water level height H is read at B4 as greater than a specified value, then it will be determined that protective action may be required.

In the control routine described in FIG. 3, protective action is not automatically initiated in the event the B value is read by the system. In accordance with this control routine, it is determined that protective action is not required unless the catalyst temperature is greater than a predetermined temperature. Catalyst temperature is indicated as $T_s$ and if this temperature is greater than a predetermined value and the condition B is met, then protective action will be initiated.

Therefore, at the step S5, the temperature of the catalyst is read and at the step S6 it is determined if the catalyst temperature is high enough as to require protective action. If at the step S6 it is determined that the temperature is too high, the program then moves to the step S7 so as to switch on and begin the protective action. In this embodiment, this condition is initiated by the CPU 41 switching on the switch 83 so as to activate the electric motor 74 and blower 73 so as to turn on the protective action and begin forcing water out of the exhaust system by pressurizing the expansion chamber section 74.

If at the step S4 it is determined that none of the read values of A are the values of B which require protective action or if it is determined at the step S6 that the catalyst temperature is not too high, then the program moves to the step S8 so as to determine if a previously initiated pressurization action is still being initiated. The pressurization action may have been initiated because of a previous condition when the value of B had been met and the temperature of the catalyst bed was too high. However, assuming that now the value of B is not that which requires protective action and/or the temperature of the catalyst bed was not too high and it is then determined at the step S8 that the protective action had been initiated, the program then moves to the step S9 so as to deactivate the protective action since it is no longer required. The program then moves to the step S10 to determine if the main switch is still on.

If at the step S10 it is determined that the main switch is still on, the program then moves back to the step S3 so as to continue to monitor the conditions to determine if protective action is subsequently required. If, however, at the step S10 it is determined that the main switch has been turned off, then the program moves to the step S11 so as to turn off the engine control and then the program ends.

If at the step S8 it has been determined that the protective action is no longer being initiated, the program then jumps to the step S10 to determine the condition of the main switch. If the main switch is still on at the step S10, the program repeats back to the step S3 to continue to monitor conditions to determine if protective action is subsequently required. If, at the step S10 it is determined that the main switch has been turned off, then the engine control is again turned off at the step S11 and the program ends.

As has been noted, this control routine is only one of many which can be employed to practice the invention. In this control routine, the protective action is begun when one of the sensed conditions, in this case, engine stop is determined although as has been noted, the sense condition can also be a rapid deceleration. However, even the existence of this condition will not initiate protective action unless the catalyst temperature is high. Of course, it may be possible to initiate protective action even if the catalyst temperature is not desired to be determined or, alternatively, the protective action can be initiated immediately if the catalyst temperature is determined to be too high. Also, the protective action is stopped when both conditions no longer exist. It may be possible to stop the protective action only when the catalyst temperature falls below a predetermined temperature or when the water level is below the predetermined water level or, alternatively, there may be a time delay where it is necessary for the two conditions or one of the conditions not to exist for more than a predetermined time before the protective action is discontinued. In addition, it is also possible to provide an arrangement wherein the protective action is only initiated for a predetermined time period and then the program again repeats to determine if new or continued protective action is required because the condition still call for it. These are only some of many types of control routines that can be employed and it will be obvious to those skilled in the art how such other control routines may be practiced.

Figure 4:
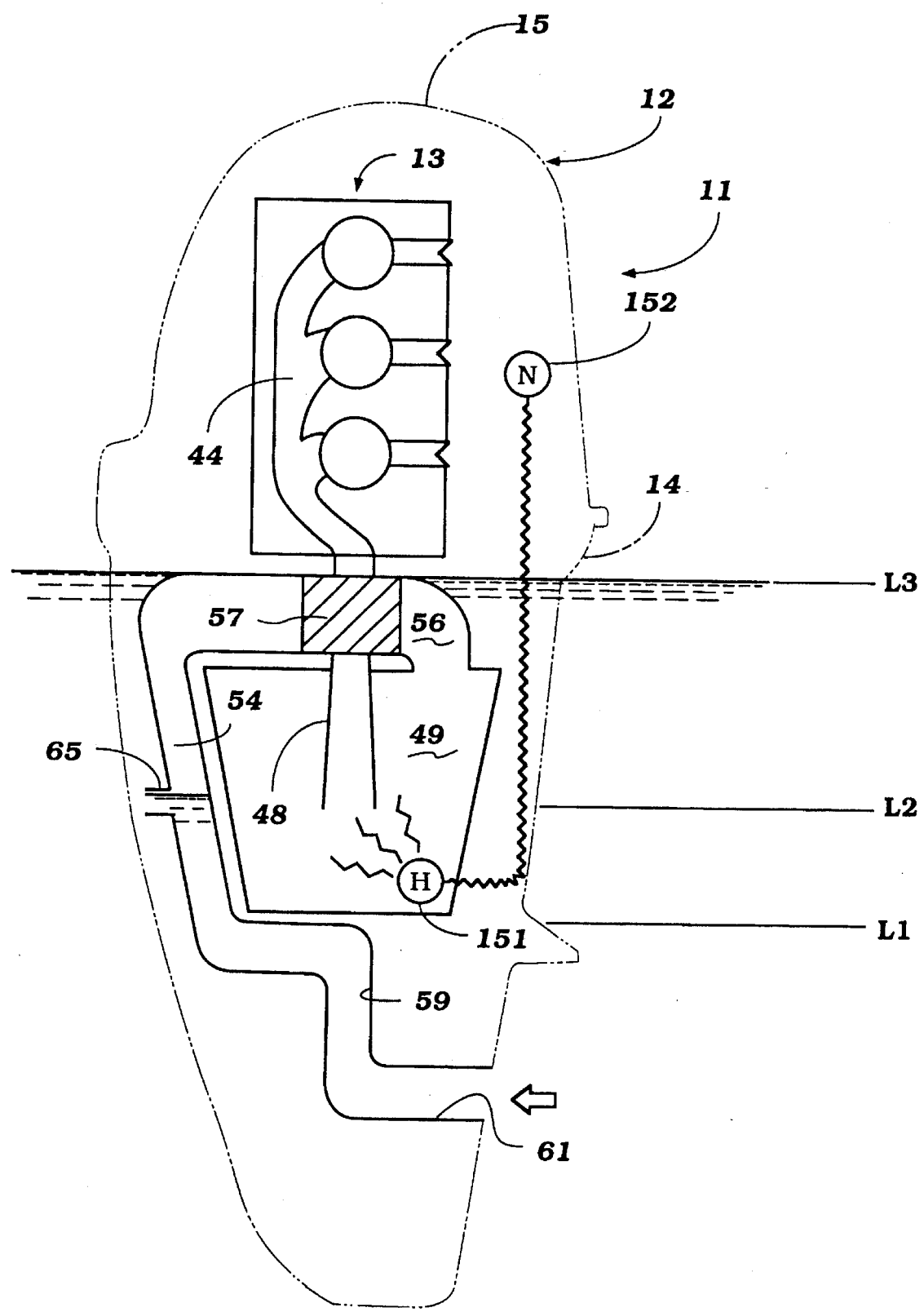
FIG. 4 is a partially schematic view, in part similar to FIG. 1, and shows another embodiment of the invention.

It has also been noted that other means may be provided so as to either drive the water level down in the exhaust conduit downstream of the catalyst bed 57 and FIG. 4 shows such another embodiment. Since this embodiment differs from the previously described embodiment only in the way in which this protective action is achieved, only a schematic view is believed necessary to permit those skilled in the art to understand how this embodiment is constructed and can be operated.

In this embodiment, the protective action is initiated by raising the pressure in the expansion chamber 49 and the expansion chamber 54 and this is done by an electrical heater 151 which, in this embodiment, is disclosed as being in the expansion chamber section 49. The electric heater 151 is provided with a power source such as a battery 152 that may be contained within the power head 12 and actuated by a system as shown schematically in FIG. 1 wherein this electric heater is also indicated by the reference numeral 151 as a separate type of protective device.

When protective action is required, and this may be sensed in any of the previously described methods, the electric heater 151 is energized from its power source 152 and the expansion chambers 49 and 54 will be heated. This will cause a pressure rise in the exhaust system which will force the water level downwardly and drive the water out of the expansion chamber 54 and away from the catalyst bed 57 in a manner which should be readily apparent to those skilled in the art.

Figure 5:
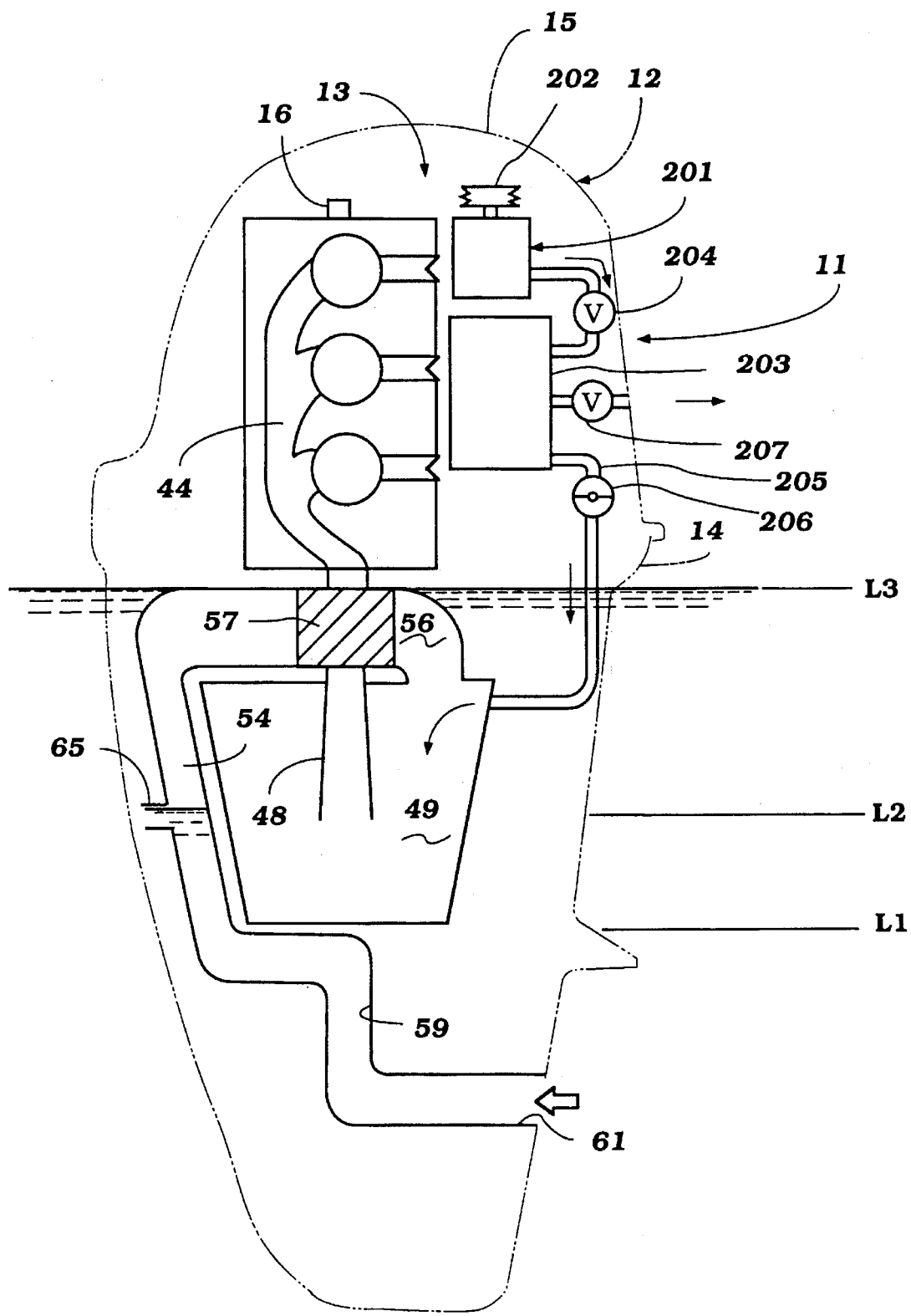
FIG. 5 is a partially schematic view, in part similar to FIGS. 1 and 4, and shows a still further embodiment of the invention.

FIG. 5 shows another embodiment of the invention which generally has the same overall construction of the outboard motor as the previously described embodiment. For that reason, this embodiment is illustrated in schematic form and components which are the same or substantially the same as those previously described have been identified by the same reference numerals. This embodiment uses a source of high pressure air for purging the exhaust system of excess water under any of the aforenoted conditions. In this embodiment, however, the excess air is provided by an air compressor 201 which has a pulley 202 driven from the engine crankshaft 16 in a well-known manner. This air compressor charges an accumulator chamber 203 that is positioned in the power head 12 within the main cowling portion 15. A pressure responsive valve 204 in the line between the air compressor 201 and the accumulator 203 determines the amount of pressure at which the accumulator 203 is charged. A conduit 205 connects the accumulator chamber 203 with the exhaust system and in this embodiment, that connection is to the expansion chamber section 49. An automatically operated valve 206 is interposed in the conduit 205 and is open when any of the aforenoted conditions are sensed which would require purging of the exhaust system from water and is closed after the purging action has been completed. Since these various control routines have already been described, further description of them is believed to be unnecessary.

In order to permit the operator to depressurize the accumulator chamber 203 at such time as the outboard motor 11 is to be stored or otherwise serviced, a manually operated valve 207 is provided within the protective cowling 15 and can be opened by the operator so as to depressurize the system.

Figure 6:
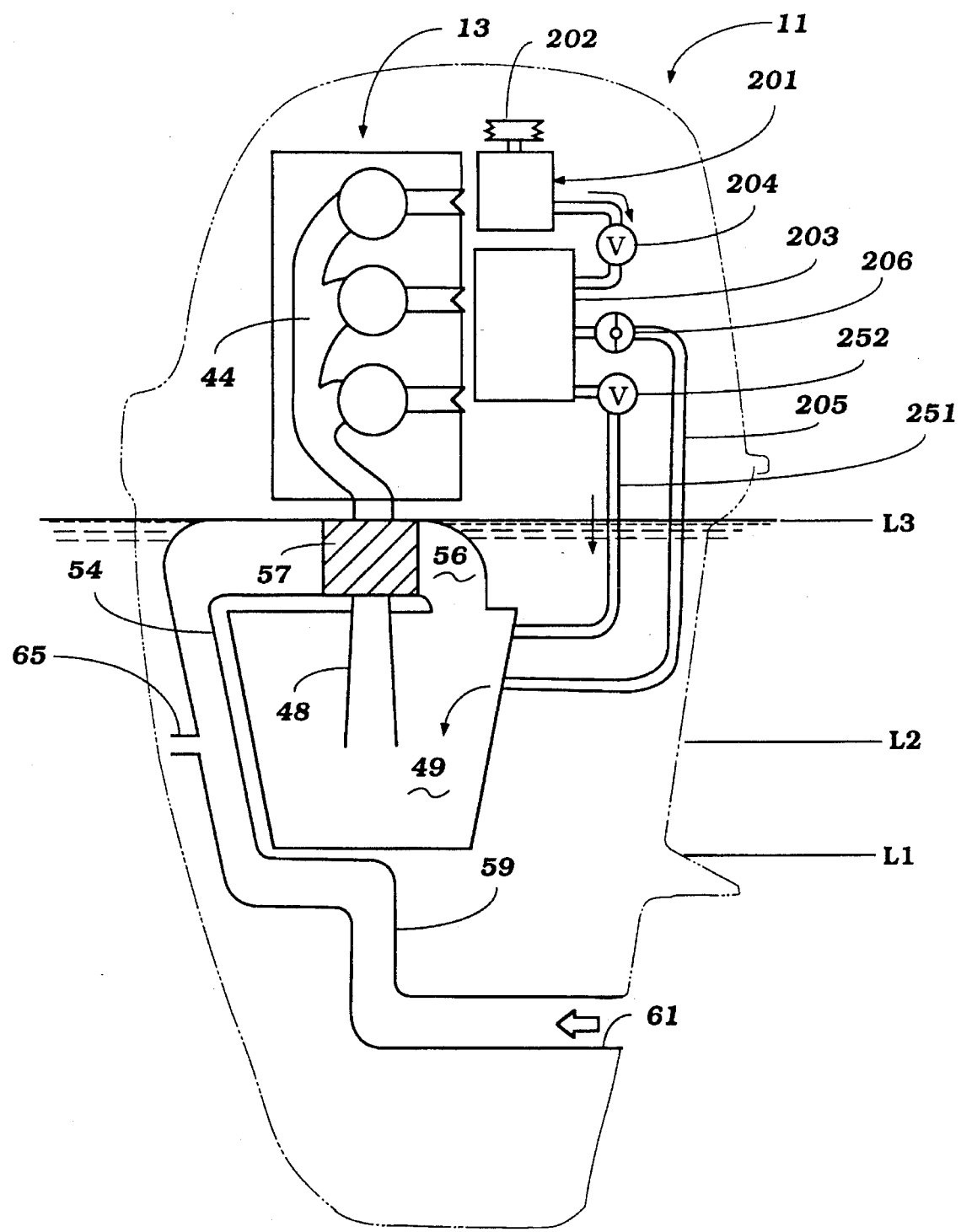
FIG. 6 is a partially schematic view, in part similar to FIGS. 1, 4, and 5, and shows a further embodiment of the invention.

FIG. 6 shows another embodiment which is generally similar to the embodiment of FIG. 5 and, for that reason, components of this embodiment which are the same as that embodiment have been identified by the same reference numerals. Again, because of the similarity of this embodiment to those previously described, only a schematic view of this embodiment is believed to be necessary to permit those skilled in the art to practice the invention. In this embodiment, rather than having an operator-controlled valve for depressurizing the accumulator chamber 203 and in order to improve performance of the catalytic bed 57, excess air is supplied to the exhaust system upstream of the catalyst bed 57 through a further conduit 251 in which a pressure responsive valve 252 is provided. The valve 252 permits a small amount of air to be bled into the expansion chamber section 49 upstream of the catalyst bed 57 at all times. This air pressure is not adequate to preclude water level rising significantly and the conduit 205 and valve 206 are provided for that purpose. However, the air delivered through the conduit 251 is adequate so as to ensure that there will be adequate oxygen for the catalyst bed 57 to operate satisfactorily. Also, when the outboard motor 11 is shut down, the conduit 251 and valve 252 will act as an air bleed so as to permit the pressure in the accumulator chamber 203 to be gradually relieved.

Figure 7:
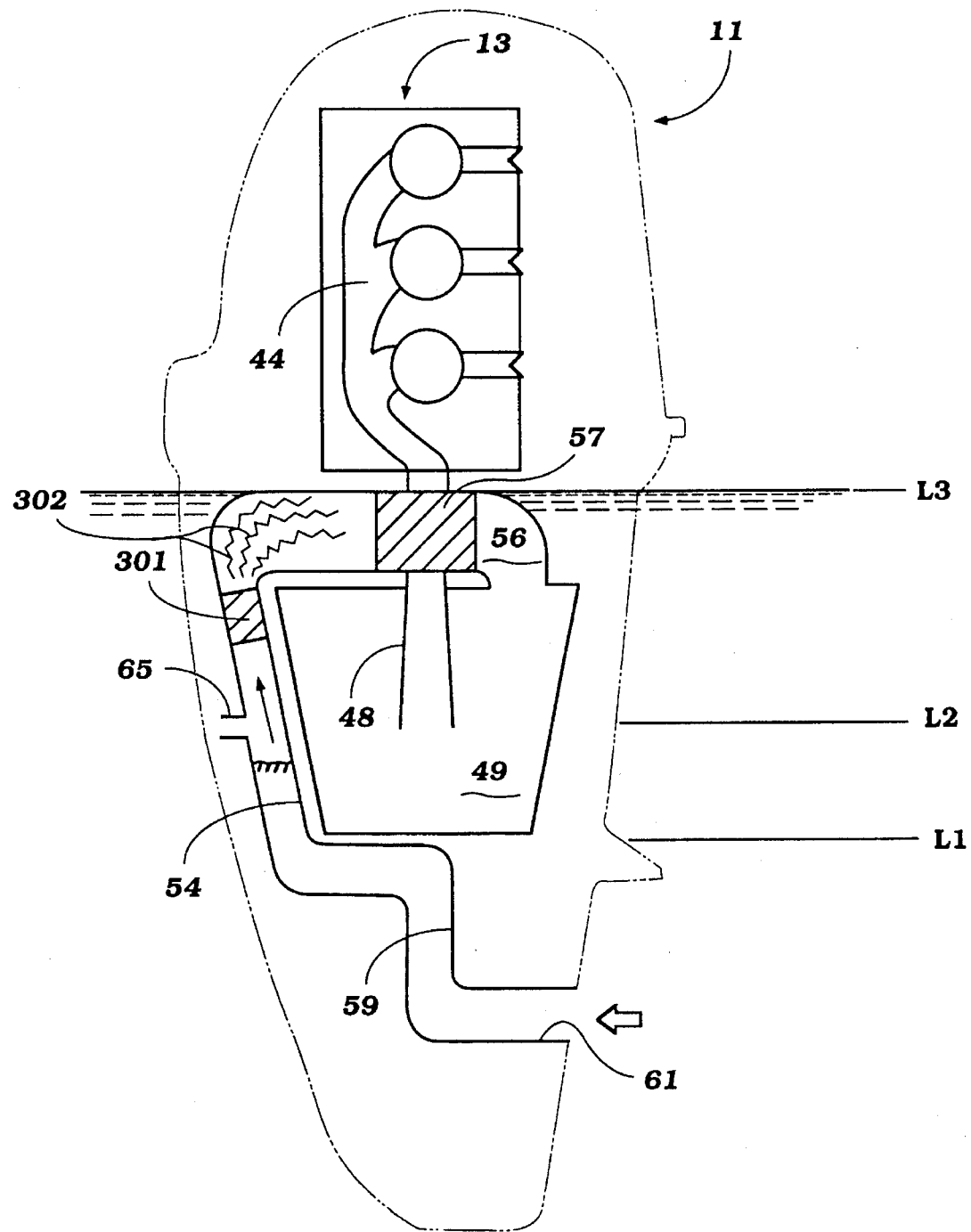
FIG. 7 is a partially schematic view, in part similar to FIGS. 1, 4, 5, and 6, and shows yet a further embodiment of the invention.

FIG. 7 shows another embodiment of the invention and this embodiment includes a device wherein it is unnecessary to provide a separate deceleration sensor and the device incorporates in its exhaust system a heat storage device, indicated generally by the reference numeral 301 which is positioned downstream of the catalyst bed 57 and above the above water exhaust gas discharge 65 in the exhaust system. This heat storage device 301 is adapted to store heat for a long period of time and may be of any suitable material. When the outboard motor 11 is rapidly decelerated or shut off, water will rise in the conduit to the heat storage section 301 and the water will be converted into steam which will expand and raise the pressure in the exhaust conduit so as to drive further water downwardly away from the catalyst bed 57. This steam is indicated schematically at 302. The heat storage device 301 is obviously porous so as to let the exhaust gases flow freely through the system but also is capable of storing sufficient heat so as to generate steam for a long enough period of time so as to ensure that the water level can return to normal even under extreme deceleration or rapid shut off condition so as to protect the catalyst bed 57.

As opposed to the various water purging devices which have been shown, it is also possible to provide some form of valve in the exhaust system downstream of the catalyst bed 57 which will shut off under extreme deceleration condition so as to preclude water from rising in the exhaust system and damaging the catalyst bed 57. Such a valve in shown schematically at 351 in FIG. 1. As has been noted, any known type of valve assembly can be implied for shutting off the exhaust system and precluding water from rising to a level sufficient to reach the catalyst bed 57.

It should be readily apparent in the foregoing description that the described embodiments of the invention are extremely effective in protecting the catalyst bed from water damage or water fowling under conditions such as extreme deceleration or engine shut off when travelling forwardly. Of course, the described embodiments of the invention are only examples of ways in which the catalyst bed can be protected and various changes in modifications may be made without departing from the spirit and scope of the invention, as defined by the appended claims.

We claim:

1. A marine outboard drive comprising an internal combustion engine having at least one exhaust port, a drive shaft housing and lower unit adapted to be supported upon the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which said watercraft is operating, exhaust conduit means for delivering exhaust gases from said exhaust port to said underwater exhaust gas discharge, and purging means responsive to a condition for precluding water from flowing above a predetermined position in said exhaust conduit means by purging water from said exhaust conduit means.

2. A marine outboard drive comprising an internal combustion engine as set forth in claim 1, wherein the means for purging water comprises means for supplying air under pressure to the exhaust conduit means for purging water therefrom.

3. A marine outboard drive comprising an internal combustion engine as set forth in claim 2, wherein the air pressure is provided by an air pump.

4. A marine outboard drive comprising an internal combustion engine as set forth in claim 3, wherein the air pump is selectively driven by an external power source.

5. A marine outboard drive comprising an internal combustion engine as set forth in claim 3, wherein the air pump charges an accumulator chamber that supplies air to the exhaust conduit means.

6. A marine outboard drive comprising an internal combustion engine as set forth in claim 5, wherein the accumulator chamber provides a first relatively low supply of air to the exhaust conduit means under all running conditions and a substantially greater supply of air to purge the water from the exhaust conduit means.

7. A marine outboard drive comprising an internal combustion engine as set forth in claim 1, wherein the purging means comprises a source of heat in the exhaust conduit means.

8. A marine outboard drive comprising an internal combustion engine as set forth in claim 7, wherein the source of heat is selectively applied to the exhaust conduit means.

9. A marine outboard drive comprising an internal combustion engine as set forth in claim 7, wherein the source of heat comprises a heat retaining member.

10. A marine outboard drive comprising an internal combustion engine as set forth in claim 1, wherein the marine outboard drive comprises an outboard motor and the engine is positioned in a power head disposed above the drive shaft housing and lower unit.

11. A marine outboard drive comprising an internal combustion engine as set forth in claim 1, further including a catalyst bed disposed in the exhaust conduit means for treating the exhaust gases flowing there through and wherein water is precluded from reaching the catalyst bed in response to the condition.

12. A marine outboard drive comprising an internal combustion engine as set forth in claim 11, wherein the means for purging water comprises means for supplying air under pressure to the exhaust conduit means for purging water therefrom.

13. A marine outboard drive comprising an internal combustion engine as set forth in claim 12, wherein the air pressure is provided by an air pump.

14. A marine outboard drive comprising an internal combustion engine as set forth in claim 13, wherein the air pump is selectively driven by an external power source.

15. A marine outboard drive comprising an internal combustion engine as set forth in claim 13, wherein the air pump charges an accumulator chamber that supplies air to the exhaust conduit means.

16. A marine outboard drive comprising an internal combustion engine as set forth in claim 15, wherein the accumulator chamber provides a first relatively low supply of air to the exhaust conduit means under all running conditions and a substantially greater supply of air to purge the water from the exhaust conduit means.

17. A marine outboard drive comprising an internal combustion engine as set forth in claim 11, further including means for sensing the condition.

18. A marine outboard drive comprising an internal combustion engine as set forth in claim 17, wherein the sensed condition comprises a water level in the exhaust conduit means.

19. A marine outboard drive comprising an internal combustion engine as set forth in claim 18, wherein the sensing means comprises a water level sensor positioned in the exhaust conduit means.

20. A marine outboard drive comprising an internal combustion engine as set forth in claim 17, wherein the sensed condition comprises deceleration.

21. A marine outboard drive comprising an internal combustion engine as set forth in claim 20, wherein the sensed deceleration comprises watercraft deceleration.

22. A marine outboard drive comprising an internal combustion engine as set forth in claim 21, wherein the watercraft deceleration is determined by a watercraft speed sensor.

23. A marine outboard drive comprising an internal combustion engine as set forth in claim 20, wherein the deceleration comprises deceleration of the engine.

24. A marine outboard drive comprising an internal combustion engine as set forth in claim 23, further including a throttle valve for controlling the speed of the engine and wherein the sensed deceleration is determined by rapid closure of the throttle valve.

25. A marine outboard drive comprising an internal combustion engine as set forth in claim 23, wherein the sensed deceleration of the engine is determined by an air flow sensor.

26. A marine outboard drive comprising an internal combustion engine as set forth in claim 23, wherein the sensed engine deceleration is sensed by sensing intake manifold vacuum.

27. A marine outboard drive comprising an internal combustion engine as set forth in claim 20, wherein the sensed deceleration is determined by measuring the engine speed and determining when engine speed rapidly is decreased.

28. A marine outboard drive comprising an internal combustion engine as set forth in claim 17, wherein the sensed condition is catalytic bed temperature.

29. A marine outboard drive comprising an internal combustion engine as set forth in claim 17, wherein the sensed condition is the stopping of the engine.

30. A marine outboard drive comprising an internal combustion engine as set forth in claim 11, further including means for discontinuing the preclusion of water from flowing above the predetermined position after the water has been precluded from flowing above the predetermined position.

31. A marine outboard drive comprising an internal combustion engine as set forth in claim 30, wherein the stopping of the preclusion is done after a predetermined time.

32. A marine outboard drive comprising an internal combustion engine as set forth in claim 30, wherein the stopping of the precluding of the water from flowing above the predetermined position is initiated after the sensed condition is no longer present.

33. A marine outboard drive comprising an internal combustion engine as set forth in claim 30, wherein the stopping of the preclusion of water is done after the temperature of the catalyst falls below a predetermined level.

34. A marine outboard drive comprising an internal combustion engine as set forth in claim 30, wherein the stopping of the preclusion is after the water level falls below a predetermined water level.

35. A marine outboard drive comprising an internal combustion engine having at least one exhaust port, a drive shaft housing and lower unit adapted to be supported upon the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which said watercraft is operating, exhaust conduit means for delivering exhaust gases from said exhaust port to said underwater exhaust gas discharge, and means responsive to a condition for precluding water from flowing above a predetermined position in said exhaust conduit means comprising a valve positioned at the predetermined position in the exhaust conduit means between said exhaust port and said underwater exhaust gas discharge.

36. A marine outboard drive comprising an internal combustion engine as set forth in claim 35, further including a catalyst in the exhaust conduit means between the exhaust port and the valve, whereby the valve precludes water from reaching the catalyst.

37. A marine outboard drive comprising an internal combustion engine having at least one exhaust port, a drive shaft housing and lower unit adapted to be supported upon the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which said watercraft is operating, exhaust conduit means for delivering exhaust gases from said exhaust port to said underwater exhaust gas discharge, means for sensing a condition, and means responsive to the sensing of the condition for precluding water from flowing above a predetermined position in said exhaust conduit means, said sensed condition comprising a water level in the exhaust conduit means.

38. A marine outboard drive comprising an internal combustion engine as set forth in claim 37, wherein the sensing means comprises a water level sensor positioned in the exhaust conduit means.

39. A marine outboard drive comprising an internal combustion engine having at least one exhaust port, a drive shaft housing and lower unit adapted to be supported upon the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which said watercraft is operating, exhaust conduit means for delivering exhaust gases from said exhaust port to said underwater exhaust gas discharge., means for sensing a condition, and means responsive to the sensing of the condition for precluding water from flowing above a predetermined position in said exhaust conduit means, said sensed condition comprising deceleration.

40. A marine outboard drive comprising an internal combustion engine as set forth in claim 39, wherein the sensed deceleration comprises watercraft deceleration.

41. A marine outboard drive comprising an internal combustion engine as set forth in claim 40, wherein the watercraft deceleration is determined by a watercraft speed sensor.

42. A marine outboard drive comprising an internal combustion engine as set forth in claim 39, wherein the deceleration comprises deceleration of the engine.

43. A marine outboard drive comprising an internal combustion engine as set forth in claim 42, further including a throttle valve for controlling the speed of the engine and wherein the sensed deceleration is determined by rapid closure of the throttle valve.

44. A marine outboard drive comprising an internal combustion engine as set forth in claim 42, wherein the sensed deceleration of the engine is determined by an air flow sensor.

45. A marine outboard drive comprising an internal combustion engine as set forth in claim 42, wherein the sensed engine decelevation is sensed by sensing intake manifold vacuum.

46. A marine outboard drive comprising an internal combustion engine as set forth in claim 42, wherein the sensed deceleration is determined by measuring the engine speed and determining when engine speed rapidly is decreased.

47. A marine outboard drive comprising an internal combustion engine having at least one exhaust port, a drive shaft housing and lower unit adapted to be supported upon the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which said watercraft is operating, exhaust conduit means for delivering exhaust gases from said exhaust port to said underwater exhaust gas discharge, means for sensing a condition, and means responsive to the sensing of the condition for precluding water from flowing above a predetermined position in said exhaust conduit means, said sensed condition comprising the initiation of stopping of the engine.

48. A marine outboard drive comprising an internal combustion engine having at least one exhaust port, a drive shaft housing and lower unit adapted to be supported upon the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which said watercraft is operating, exhaust conduit means for delivering exhaust gases from said exhaust port to said underwater exhaust gas discharge, means for sensing a plurality of conditions, and means responsive to the sensing of any one of said plurality of conditions sensed for precluding water from flowing above a predetermined position in said exhaust conduit means in response to the sensing of any of said conditions.

49. A marine outboard drive comprising an internal combustion engine as set forth in claim 48, wherein one of the conditions comprises water level in the exhaust conduit means.

50. A marine outboard drive comprising an internal combustion engine as set forth in claim 48, wherein one of the conditions sensed is engine speed deceleration.

51. A marine outboard drive comprising an internal combustion engine as set forth in claim 48, wherein one of the sensed conditions comprises deceleration of the associated watercraft.

52. A marine outboard drive comprising an internal combustion engine as set forth in claim 48, wherein one of the sensed conditions comprises stopping of the engine.

53. A marine outboard drive comprising an internal combustion engine having at least one exhaust port, a drive shaft housing and lower unit adapted to be supported on the transom of an associated watercraft and having a propulsion device driven by said engine for propelling said watercraft through a body of water, an underwater exhaust gas discharge formed in said drive shaft housing and lower unit for discharging exhaust gases to the atmosphere through the body of water in which the watercraft is operating, exhaust conduit means for delivering exhaust gases from said exhaust port to said underwater exhaust gas discharge, and means responsive to a condition for precluding water from flowing above a predetermined position in said exhaust conduit means by providing a source of heat in said exhaust conduit means.

54. A marine outboard drive comprising an internal combustion engine as set forth in claim 53, wherein the source of heat is selectively applied to the exhaust conduit means.

55. A marine outboard drive comprising an internal combustion engine as set forth in claim 53, wherein the source of heat comprises a heat retaining member.

* * * * *